(12) United States Patent
Nakura et al.

(10) Patent No.: US 12,457,526 B2
(45) Date of Patent: Oct. 28, 2025

(54) CONTROLLER, CONTROL CIRCUIT, AND RESOURCE ALLOCATION METHOD

(71) Applicant: Mitsubishi Electric Corporation, Tokyo (JP)

(72) Inventors: Kenichi Nakura, Tokyo (JP); Takeshi Suehiro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 322 days.

(21) Appl. No.: 18/223,902

(22) Filed: Jul. 19, 2023

(65) Prior Publication Data

US 2023/0362735 A1   Nov. 9, 2023

Related U.S. Application Data

(63) Continuation of application No. PCT/JP2021/005316, filed on Feb. 12, 2021.

(51) Int. Cl.
*H04W 28/16* (2009.01)
*H04W 28/02* (2009.01)

(52) U.S. Cl.
CPC ....... *H04W 28/16* (2013.01); *H04W 28/0289* (2013.01)

(58) Field of Classification Search
None
See application file for complete search history.

(56) References Cited

U.S. PATENT DOCUMENTS 7,567,359 B2 * 7/2009 Tameshige ............ G06F 9/5055
                                                            718/1
2019/0289647 A1 * 9/2019 Li ........................... H04L 41/40
2021/0153113 A1 * 5/2021 Nakura ................. H04W 28/16
2022/0231963 A1 * 7/2022 Iwasaki ................... H04L 47/83

FOREIGN PATENT DOCUMENTS

JP       2016-116184 A    6/2016
WO   WO 2020/053989 A1   3/2020

OTHER PUBLICATIONS

International Search Report for PCT/JP2021/005316 mailed on Mar. 30, 2021.

* cited by examiner

*Primary Examiner* — Quang N Nguyen
(74) *Attorney, Agent, or Firm* — Birch, Stewart, Kolasch & Birch, LLP

(57) ABSTRACT

A controller includes a physical network information acquisition unit obtaining information about resource of a device and information about connection between devices in a wireless access network, a physical path calculation unit calculating physical path resource information based on the information about resource of the device and the information about connection between the devices, an abstract path resource calculation unit calculating abstract path resource information based on the physical path resource information, an abstract path correlation calculation unit generating correlation information between abstract paths, a resource pool storing the abstract path resource information and the correlation information, a temporary resource pool temporarily storing the abstract path resource information and the correlation information, an abstract resource allocation unit determining whether a slice meeting a requirement of a slice request can be generated, and a temporary resource calculation unit updating information in the temporary resource pool.

10 Claims, 11 Drawing Sheets

FIG.3

| DEVICE | DEVICE DELAY [us] | UTILIZATION RATIO | PORT | MAXIMUM BANDWIDTH [Gbps] |
|---|---|---|---|---|
| SW51 | 1 | 0.9 | 1 | 1 |
| | | | 2 | 1 |
| | | | 3 | 1 |
| | | | 4 | 10 |
| SW52 | 1 | 0.5 | 1 | 0.1 |
| | | | 2 | 0.1 |
| SW53 | 1 | 0.9 | 1 | 10 |
| | | | 2 | 10 |
| SW54 | 1 | 0.9 | 1 | 1 |
| | | | 2 | 1 |
| | | | 3 | 1 |
| OLT31 | 100 | 0.9 | 1 | 1 |
| | | | 2 | 1 |
| ONU21 | 100 | 0.9 | 1 | 1 |

FIG.4

| LINK | START POINT NODE | END POINT NODE | TRANS-MISSION DELAY [us] | MAXIMUM BANDWIDTH [Gbps] | AVAILABLE BANDWIDTH [Gbps] |
|---|---|---|---|---|---|
| L1 | ONU21-1 | OLT31-1 | 100 | 1 | 1 |
| L2 | ONU22-1 | OLT31-1 | 100 | 1 | 1 |
| L3 | OLT31-2 | SW51-1 | 1 | 1 | 1 |
| L4 | SW51-3 | SW52-1 | 1 | 0.1 | 0.1 |
| L5 | SW52-2 | SW54-1 | 1 | 0.1 | 0.1 |
| L6 | SW51-4 | SW53-1 | 200 | 10 | 10 |
| L7 | SW53-2 | SW54-2 | 1 | 1 | 1 |
| L8 | SW54-3 | SW55-1 | 1 | 1 | 1 |
| ... | ... | ... | ... | ... | ... |

FIG.5

| PHYSICAL PATH | AMOUNT OF DELAY [us] | MAXIMUM BANDWIDTH [Gbps] | UTILIZATION RATIO | AVAILABLE BANDWIDTH [Gbps] |
|---|---|---|---|---|
| 1 | 308 | 0.1 | 0.32 | 0.1 |
| 2 | 507 | 1.0 | 0.59 | 1.0 |

FIG.6

| ABSTRACT PATH | END POINT 1 | END POINT 2 | MINIMUM AMOUNT OF DELAY [μs] | MAXIMUM BANDWIDTH AT MINIMUM AMOUNT OF DELAY [Gbps] | MAXIMUM BANDWIDTH WITHOUT CONSIDERATION OF DELAY [Gbps] | MAXIMUM UTILIZATION RATIO |
|---|---|---|---|---|---|---|
| 1 | LOWER-LEVEL DEVICE 11 | HIGHER-LEVEL DEVICE 61 | 308 | 0.1 | 1.0 | 0.59 |
| 2 | LOWER-LEVEL DEVICE 12 | HIGHER-LEVEL DEVICE 61 | △△ | ○○ | ×× | ◇◇ |
| 3 | LOWER-LEVEL DEVICE 13 | HIGHER-LEVEL DEVICE 61 | △△ | ○○ | ×× | ◇◇ |

FIG.7

|  | ABSTRACT PATH 1 | ABSTRACT PATH 2 | ABSTRACT PATH 3 | ABSTRACT PATH 4 |
|---|---|---|---|---|
| ABSTRACT PATH 1 | - | * | * | 1 |
| ABSTRACT PATH 2 | * | - | * | * |
| ABSTRACT PATH 3 | * | * | - | * |
| ABSTRACT PATH 4 | 1 | * | * | - |

FIG.8

|  | AFFECTED PATH |
|---|---|
| ABSTRACT PATH 1 | ABSTRACT PATH 4, ABSTRACT PATH X |
| ABSTRACT PATH 2 | * |
| ABSTRACT PATH 3 | * |
| ABSTRACT PATH 4 | ABSTRACT PATH 1, ABSTRACT PATH X |

FIG.14

|  |  | AFFECTED PATH | | | |
|---|---|---|---|---|---|
|  |  | ABSTRACT PATH 1 | ABSTRACT PATH 2 | ABSTRACT PATH 3 | ABSTRACT PATH 4 |
| PATH FOR ALLOCATION | ABSTRACT PATH 1 |  | -400 | xx | -200 |
|  | ABSTRACT PATH 2 | xx |  | xx | xx |
|  | ABSTRACT PATH 3 | xx | xx |  | xx |
|  | ABSTRACT PATH 4 | -300 | xx | xx |  |

CONTROLLER, CONTROL CIRCUIT, AND RESOURCE ALLOCATION METHOD

CROSS-REFERENCE TO RELATED APPLICATION

This application is a continuation application of International Application PCT/JP2021/005316, filed on Feb. 12, 2021, and designating the U.S., the entire contents of which are incorporated herein by reference.

BACKGROUND OF THE INVENTION

1. Field of the Invention

The present disclosure relates to a controller, a control circuit, and a resource allocation method for a wireless access network.

2. Description of the Related Art

It is predicted that in future a single communication network will cover multiple services having different communication requirements, such as for example, a mobile broadband service requiring a high data rate, a mission-critical service requiring high reliability and low latency, and a sensor information collection service requiring high-density device deployment. A technique of assigning these communication services to respective slices generated in a same physical network or in virtual networks to cover these communication services together in a single communication network is currently under study.

A slice is a logical network that is logically separated. A controller managing a slice reserves a resource necessary for a requested communication service on a per-device basis, from an amount of resource available for each device present in the network, and allocates that resource to the slice. However, when many types of services are covered, cases may occur, for example, where multiple slice requests are to be simultaneously processed, and/or where the actual usage, the communication quality, and/or the like are monitored with respect to a slice generated, and the amount of resource is then adjusted, with a short time interval, to an appropriate amount of resource depending on the usage, the communication quality, and/or the like.

To allocate, to a slice, a resource necessary for providing a requested communication service, a technology of accurately and efficiently collecting and managing information about the communication resource possessed by each device is under study. For example, Japanese Patent Application Laid-open No. 2016-116184 discloses a technology in which a controller holds, in tabular form, information about resource possessed by each device and information about connection between each device pair, and upon reception of a request for generating a slice, sequentially looks up the tables of the information about resource of each device and of the information about connection between each device pair present along the communication route.

However, according to the foregoing conventional technology, the controller sequentially looks up the resource information on all the devices present on the route forming the slice to perform allocation based on the amount of available resource. This presents a problem in that the controller is subjected to a high load in slice generation.

The present disclosure has been made in view of the foregoing, and it is an object of the present disclosure to provide a controller capable of performing resource allocation that satisfies the service requirement by accurate recognition of the amount of resource of each device in the wireless access network while reducing the load imposed in slice generation.

SUMMARY OF THE INVENTION

In order to solve the above-stated problems and achieve the object, a controller according to the present disclosure includes: a physical network information acquisition unit to obtain information about resource of a device and information about connection between devices in a wireless access network; a physical path calculation unit to calculate physical path resource information based on the information about resource of the device and on the information about connection between the devices, the physical path resource information being information about resource of a physical path between the devices; an abstract path resource calculation unit to calculate abstract path resource information based on the physical path resource information, the abstract path resource information representing representative of the physical path resource information; and an abstract path correlation calculation unit to generate correlation information based on the abstract path resource information and on link information associated with information about resource extracted as the abstract path resource information, the correlation information being information about correlation between abstract paths. Moreover, the controller includes a resource pool to store the abstract path resource information and the correlation information; a temporary resource pool to temporarily store the abstract path resource information and the correlation information, each being information stored in the resource pool; an abstract resource allocation unit to determine, upon reception of a slice request, whether a slice meeting a requirement is capable of being generated, based on information stored in the temporary resource pool, and to issue an instruction to reserve a physical path when determining that a slice meeting the requirement is capable of being generated; and a temporary resource calculation unit to update the information in the temporary resource pool based on an abstract resource allocated to the slice from the abstract path by the abstract resource allocation unit.

BRIEF DESCRIPTION OF THE DRAWINGS

FIG. 3 is a diagram illustrating an example of information about resource of each device obtained by a physical network information acquisition unit according to the first embodiment;

FIG. 4 is a diagram illustrating an example of information about connection between each device pair obtained by the physical network information acquisition unit according to the first embodiment;

FIG. 5 is a diagram illustrating an example of information about resources of physical paths between a higher-level device and a lower-level device, calculated by a physical path calculation unit according to the first embodiment;

FIG. 6 is a diagram illustrating an example of abstract path resource information calculated by an abstract path resource calculation unit according to the first embodiment;

FIG. 7 is a first diagram illustrating an example of correlation information generated by an abstract path correlation calculation unit according to the first embodiment;

FIG. 8 is a second diagram illustrating an example of correlation information generated by the abstract path correlation calculation unit according to the first embodiment;

FIG. 14 is a diagram illustrating additional information of correlation information, generated by an abstract path correlation calculation unit according to the second embodiment.

DETAILED DESCRIPTION OF THE PREFERRED EMBODIMENTS

A controller, a control circuit, and a resource allocation method according to embodiments of the present disclosure will be described in detail below with reference to the drawings.

First Embodiment

Figure 1:
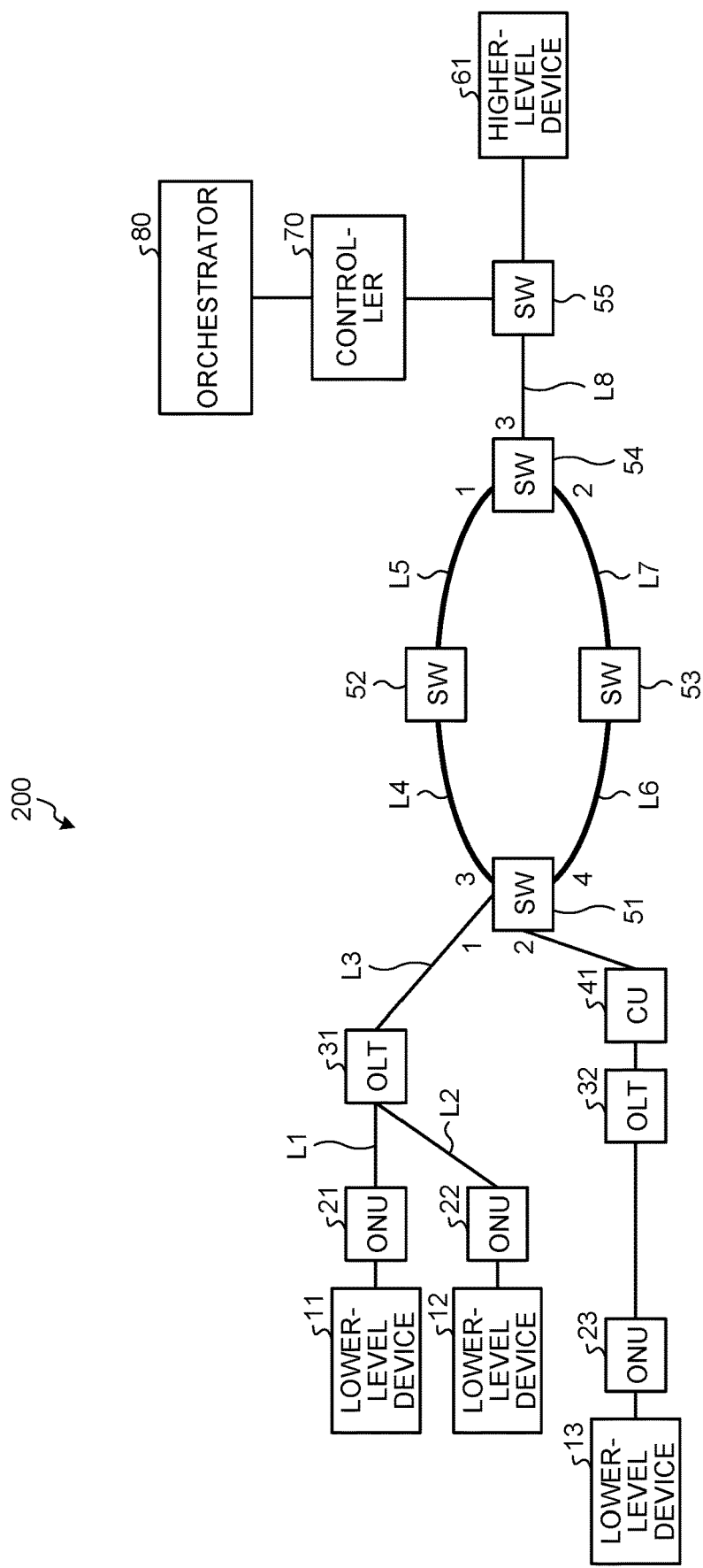
FIG. 1 is a diagram illustrating an example configuration of a wireless access network according to a first embodiment.

FIG. 1 is a diagram illustrating an example configuration of a wireless access network 200 according to a first embodiment. The wireless access network 200 includes lower-level devices 11 to 13, optical network units (ONUs) 21 to 23, optical line terminals (OLTs) 31 and 32, a central unit (CU) 41, switches (hereinafter each denoted by SW) 51 to 55, a higher-level device 61, a controller 70, and an orchestrator 80. The wireless access network 200 includes network devices forming a physical network, the controller 70 for configuring and managing the network devices, and the orchestrator 80, which receives a service requirement from a user and generates a slice request. The network devices include the lower-level devices 11 to 13, the ONUs 21 to 23, the OLTs 31 and 32, the CU 41, the SWs 51 to 55, and the higher-level device 61.

The lower-level devices 11 to 13 are each a device, such as a user terminal or a sensor, that generates, transmits, and/or receives data. Alternatively, the lower-level devices 11 to 13 may be a network device that relays data. The lower-level devices 11 to 13 may not necessarily be subjected to configuration, management, and/or the like by the controller 70 in terms of communication resources, calculation resources, and the like.

The higher-level device 61 is a device, such as an application server, that generates, transmits, and/or receives data. Alternatively, the higher-level device 61 may be a network device that relays data. The higher-level device 61 may not necessarily be subjected to configuration, management, and/or the like by the controller 70 in terms of communication resources, calculation resources, and the like.

The ONUs 21 to 23 are optical network units belonging to subscribers. The OLTs 31 and 32 are optical network units belonging to the operator. The CU 41 is a concentration base station, which performs data processing for wireless base stations (not illustrated). The SWs 51 to 55 are each a relay device having multiple ports to relay data.

Among the network devices, the ONUs 21 to 23, the OLTs 31 and 32, the CU 41, and the SWs 51 to 55 each have, for purposes of relaying data, functionality to perform a transfer operation depending on properties of data, functionality to perform an operation of a communication protocol, functionality to perform processing of an application, and the like. These network devices each have, as resources thereof, a communication bandwidth, a data storage memory, a calculation function of a central processing unit (CPU) and/or the like, necessary for the functionalities described above. These network devices perform reservation, release, and other operations on such resources under control of the controller 70. The network devices may hereinafter each referred to simply as device.

The controller 70 establishes a connection with devices in the physical network to know the amount of resource possessed by each device, and in response to a slice request, which is a request for generating a slice, from the orchestrator 80, allocates a resource to the slice. Note that connection lines between the controller 70 and associated devices are not illustrated in the wireless access network 200 illustrated in FIG. 1.

The orchestrator 80 generates the connection destination, requirements, and the like of the slice based on a service requirement from the user, and issues a slice request to the controller 70.

In the wireless access network 200, the controller 70 or the orchestrator 80 monitors the communications traffic, the communication quality, and/or the like of each service or of each slice, and performs adjustment such as increasing or decreasing of the amount of resource allocated to the slice.

Figure 2:
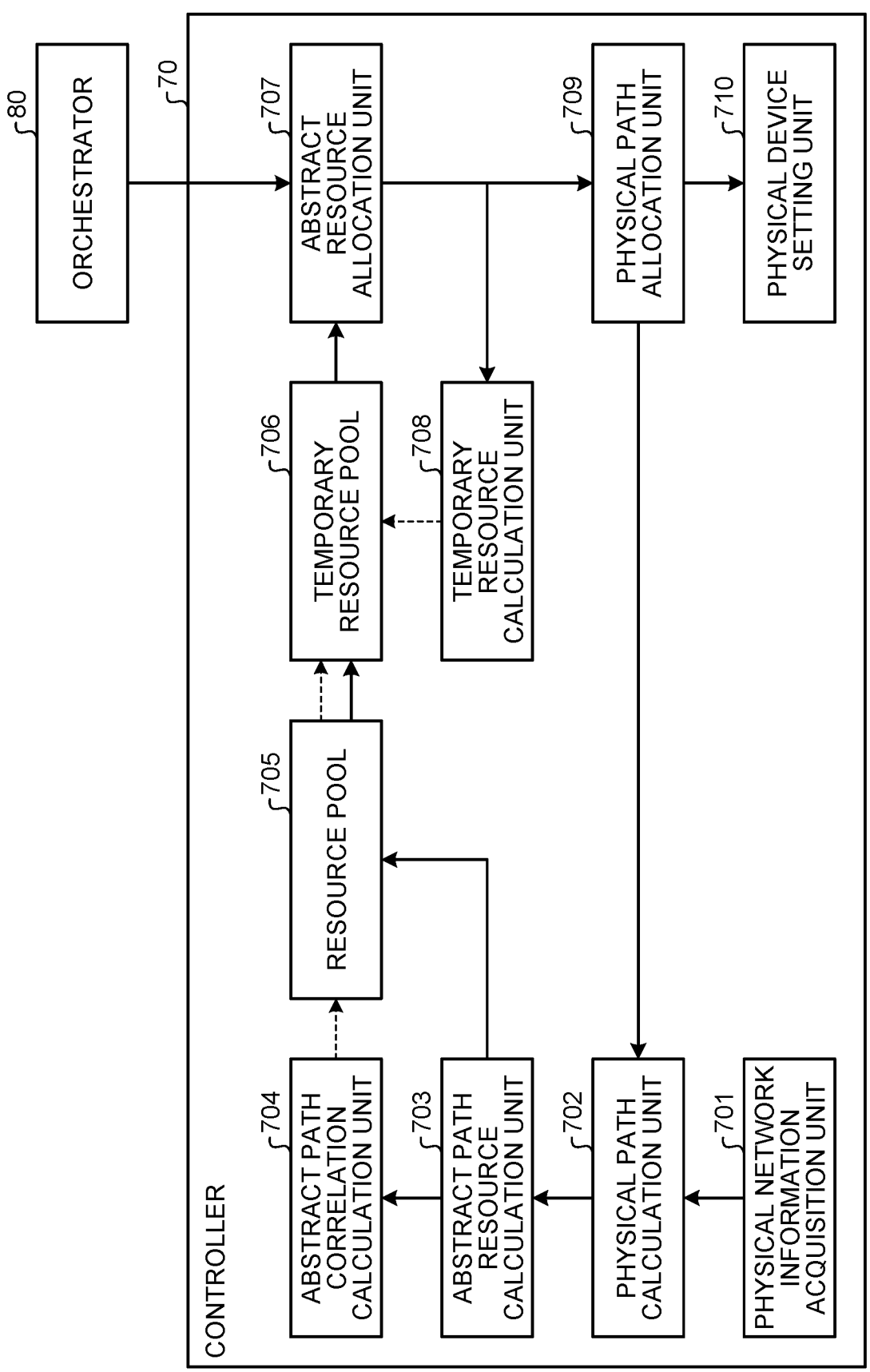
FIG. 2 is a block diagram illustrating an example configuration of a controller according to the first embodiment.

A configuration and an operation of the controller 70 will next be specifically described. FIG. 2 is a block diagram illustrating an example configuration of the controller 70 according to the first embodiment. The controller 70 includes a physical network information acquisition unit 701, a physical path calculation unit 702, an abstract path resource calculation unit 703, an abstract path correlation calculation unit 704, a resource pool 705, a temporary resource pool 706, an abstract resource allocation unit 707, a temporary resource calculation unit 708, a physical path allocation unit 709, and a physical device setting unit 710. Note that the arrows in FIG. 2 represent a flow of data.

(Physical Network Information Acquisition Unit 701)

The physical network information acquisition unit 701 obtains information about resource of each device and information about connection between each device pair, from each device in the wireless access network 200, i.e., in the physical network.

FIG. 3 is a diagram illustrating an example of the information about resource of each device obtained by the physical network information acquisition unit 701 according to the first embodiment. The example of FIG. 3 depicts that, for example, the SW 51 has four ports 1 to 4, of which ports 1 to 3 each have a maximum bandwidth of 1 gigabit per second (Gbps) and port 4 has a maximum bandwidth of 10 Gbps. In FIG. 3, the device delay represents the transfer delay between ports of that device.

FIG. 4 is a diagram illustrating an example of the information about connection between each device pair obtained by the physical network information acquisition unit 701 according to the first embodiment. The example of FIG. 4 depicts that, for example, the link L1 represents a connection between port 1 of the ONU 21 and port 1 of the OLT 31, the transmission delay is 100 microseconds, the maximum bandwidth is 1 Gbps, and the current available bandwidth is 1 Gbps. Note that the physical network information acquisition unit 701 may manage the information about connection between each device pair individually for each direction of communication.

The physical network information acquisition unit 701 can obtain the information about resource of each device illustrated in FIG. 3 and the information about connection between each device pair illustrated in FIG. 4 by using methods such as sending a query to each device, use of route search protocol, and reading information possessed by the network administrator.

(Physical Path Calculation Unit 702)

The physical path calculation unit 702 calculates physical path resource information based on the information about resource of each device and on the information about connection between each device pair obtained by the physical network information acquisition unit 701. The physical path resource information is information about resource of a physical route, i.e., a physical path, between each device pair.

Specifically, the physical path calculation unit 702 first calculates a physical path between two defined devices based on the information about connection between each device pair of FIG. 4, obtained by the physical network information acquisition unit 701. The physical paths calculated by the physical path calculation unit 702 at least include a physical path between a device connected to the higher-level device 61 and a device connected to one of the lower-level devices 11 to 13. In addition, the physical paths calculated by the physical path calculation unit 702 may further include a physical path between devices specifically specified, or may include physical paths between all the devices.

Next, the physical path calculation unit 702 calculates physical path resource information based on the previously-calculated physical paths between two devices, on the information about resource of each device illustrated in FIG. 3, and on the information about connection between each device pair illustrated in FIG. 4. The physical path resource information is information about resource of a physical path between two devices. Examples of the physical path resource information calculated by the physical path calculation unit 702 include the amount of delay, the maximum bandwidth, the utilization ratio, and the available bandwidth.

FIG. 5 is a diagram illustrating an example of information about resources of physical paths between the higher-level device 61 and the lower-level device 11, calculated by the physical path calculation unit 702 according to the first embodiment. There are two physical paths due to different routes through SWs existing therebetween, and the maximum bandwidth available in each physical path and the amount of accumulated delay of each physical path are extracted. Regarding FIG. 5, the amount of delay is calculated by accumulating the device delay of each device present along the physical path and the transmission delay between each device pair present along the physical path. The maximum bandwidth is the highest bandwidth usable in that physical path. When there is a bottleneck device, the maximum bandwidth is limited by the bottleneck device. That is, the maximum bandwidth is the lowest of the maximum bandwidths of the respective devices present along the physical path and the maximum bandwidths between the respective device pairs present along the physical path. The available bandwidth is the lowest of the available bandwidths between the respective device pairs present along the physical path.

(Abstract Path Resource Calculation Unit 703)

The abstract path resource calculation unit 703 calculates abstract path resource information representing representative of the resources of multiple physical paths between two devices, based on the physical path resource information calculated by the physical path calculation unit 702.

FIG. 6 is a diagram illustrating an example of abstract path resource information calculated by the abstract path resource calculation unit 703 according to the first embodiment. An abstract path corresponds to a set of physical paths defined by end point 1 and end point 2 of FIG. 6. In FIG. 6, abstract path 1, for example, is associated with the minimum amount of delay, the maximum bandwidth under a condition of the minimum amount of delay, the maximum bandwidth without consideration of delay, and the maximum utilization ratio, which have been extracted from the physical path resource information illustrated in FIG. 5. In FIG. 6, the minimum amount of delay is the lowest of the amounts of delay of the respective physical paths. The maximum bandwidth under a condition of the minimum amount of delay is the available bandwidth of a physical path having the lowest amount of delay. The maximum bandwidth without consideration of delay is the highest of the maximum bandwidths of the respective physical paths. The maximum utilization ratio is the highest of the utilization ratios of the respective physical paths.

(Abstract Path Correlation Calculation Unit 704)

The abstract path correlation calculation unit 704 collects bottleneck link information, which has been used by the abstract path resource calculation unit 703 to calculate the abstract path resource information and has served as a basis of the maximum bandwidth under a condition of the minimum amount of delay for each abstract path. The abstract path correlation calculation unit 704 extracts abstract paths having same bottleneck link information as each other, using the bottleneck link information of each abstract path, and thus generates correlation information as illustrated in FIG. 7. That is, the abstract path correlation calculation unit 704 generates correlation information, which is information about correlation between abstract paths, based on the abstract path resource information and on link information associated with information about resource extracted as the abstract path resource information. FIG. 7 is a first diagram illustrating an example of correlation information generated by the abstract path correlation calculation unit 704 according to the first embodiment. In FIG. 7, a flag is set to "1" for an abstract path that will be affected. Alternatively, the abstract path correlation calculation unit 704 may list the abstract paths having a correlation with each abstract path as illustrated in FIG. 8. FIG. 8 is a second diagram illustrating an example of correlation information generated by the abstract path correlation calculation unit 704 according to the first embodiment. Note that the abstract path correlation calculation unit 704 may provide a notification of an identifier representing a link that acts as a bottleneck on a per-abstract path basis.

(Resource Pool 705)

The resource pool 705 has functionality to store the abstract path resource information calculated by the abstract path resource calculation unit 703 and the correlation information generated by the abstract path correlation calculation unit 704.

Note that the abstract path resource information calculated by the abstract path resource calculation unit 703 and the correlation information generated by the abstract path correlation calculation unit 704 are updated when, for example, in the controller 70, the physical network information acquisition unit 701 obtains information about resource and information about connection between each device pair from each device or the physical path allocation unit 709 (described later) sets a physical path.

(Temporary Resource Pool 706)

The temporary resource pool 706 reads the abstract path resource information and the correlation information from the resource pool 705 when the resource pool 705 newly stores the abstract path resource information and the correlation information or when the abstract path resource information and the correlation information stored in the resource pool 705 are updated. That is, the temporary resource pool 706 obtains the abstract path resource information and the correlation information from the resource pool 705 each time the abstract path resource calculation unit 703 calculates the abstract path resource information, the abstract path correlation calculation unit 704 generates the correlation information, and the resource pool 705 stores the abstract path resource information and the correlation information. The temporary resource pool 706 temporarily stores the abstract path resource information and the correlation information, which are each information stored in the resource pool 705. The abstract path resource information and the correlation information that have been read into the temporary resource pool 706 are updated by the temporary resource calculation unit 708.

(Abstract Resource Allocation Unit 707)

The abstract resource allocation unit 707 allocates an abstract resource of an abstract path to the slice in response to a slice request received from the orchestrator 80, based on requested delay level, bandwidth, and/or the like, using the abstract path resource information that has been read into the temporary resource pool 706. Specifically, upon reception of a slice request, the abstract resource allocation unit 707 determines whether a slice meeting the requirement can be generated, based on information stored in the temporary resource pool 706. When the abstract resource allocation unit 707 determines that a slice meeting the requirement can be generated, the abstract resource allocation unit 707 instructs the physical path allocation unit 709 to reserve a physical path.

(Temporary Resource Calculation Unit 708)

When the abstract resource allocation unit 707 has allocated an abstract resource of an abstract path to the slice, the temporary resource calculation unit 708 subtracts or adds the amount of allocation of the abstract resource that has been allocated to the slice, from or to the applicable abstract path. The temporary resource calculation unit 708 also performs subtraction or addition on the abstract resource(s) of correlated abstract path(s) using the correlation information in FIG. 7 or 8 that has been read into the temporary resource pool 706. That is, the temporary resource calculation unit 708 updates the information in the temporary resource pool 706 based on the abstract resource that has been allocated to the slice from the abstract path by the abstract resource allocation unit 707. The temporary resource calculation unit 708 updates the abstract resource of the abstract path that has undergone allocation, based on the result of allocation of the abstract resource performed by the abstract resource allocation unit 707, and also updates the abstract resource(s) of abstract path(s) that will be affected, based on the correlation information.

(Physical Path Allocation Unit 709)

When the abstract resource allocation unit 707 has allocated an abstract resource to the slice, and the amount of allocation has been fixed, the physical path allocation unit 709 reserves a physical path, that is, performs setting of a physical path and reserves a physical resource, to achieve the amount of allocation of the abstract resource that has been allocated to the slice, according to an instruction from the abstract resource allocation unit 707.

(Physical Device Setting Unit 710)

The physical device setting unit 710 performs setting of the available bandwidth and the like on each device in the physical network based on setting of the physical path performed by the physical path allocation unit 709.

Figure 9:
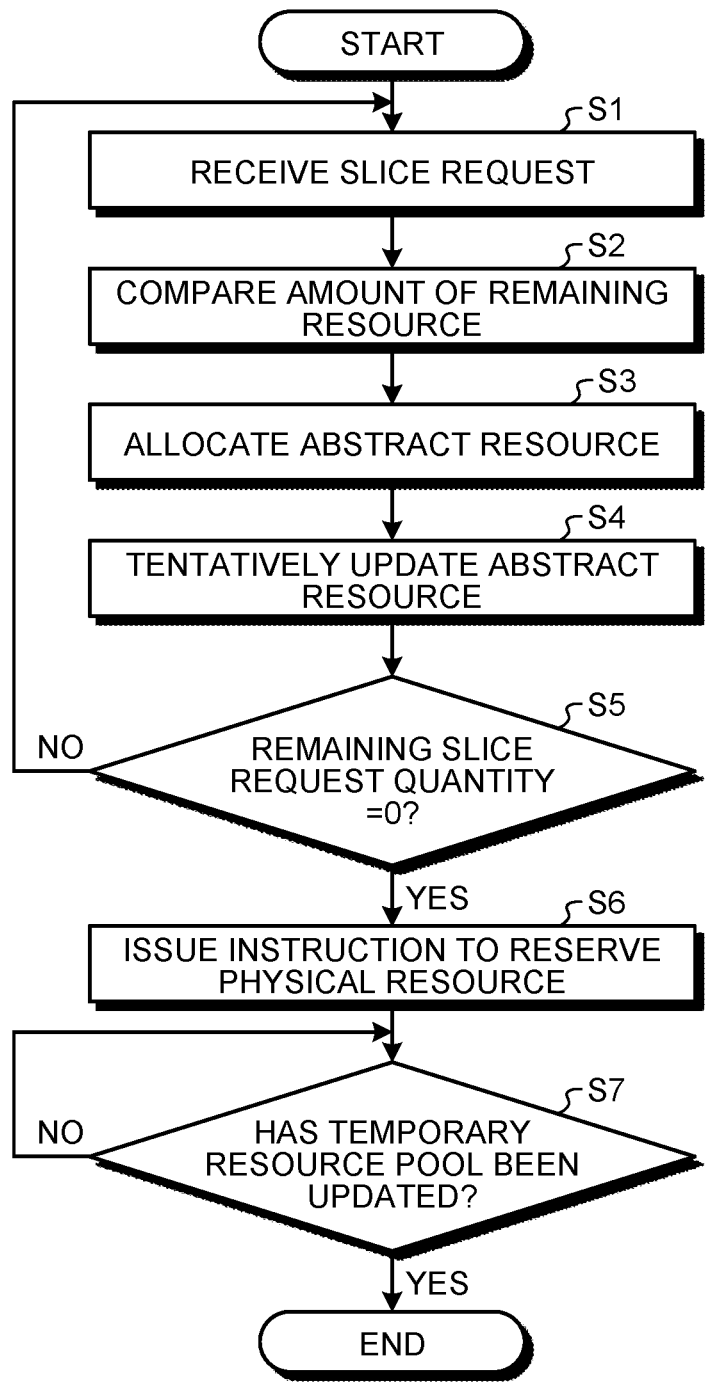
FIG. 9 is a flowchart illustrating an operation of the controller according to the first embodiment.

FIG. 9 is a flowchart illustrating an operation of the controller 70 according to the first embodiment. In the controller 70, the abstract resource allocation unit 707 receives a slice request from the orchestrator 80 (step S1). The abstract resource allocation unit 707 refers to the abstract path resource information stored in the temporary resource pool 706, and compares the amount of abstract resource allocatable to the slice, i.e., the amount of remaining resource, in each abstract path, with the delay level, bandwidth, and/or the like requested in the slice request (step S2). The abstract resource allocation unit 707 allocates an abstract resource to the slice from the abstract resource allocatable to the slice, i.e., the amount of remaining resource, in each abstract path (step S3). When the abstract resource allocation unit 707 has allocated an abstract resource of an abstract path to the slice, the temporary resource calculation unit 708 tentatively updates the abstract resource of the applicable abstract path in the abstract path resource information stored in the temporary resource pool 706 (step S4).

When there is a remaining slice request that has not yet been processed in allocation of an abstract resource to the slice in the slice requests received from the orchestrator 80 (step S5: No), the abstract resource allocation unit 707 returns the process to step S1, and performs an operation similar to the foregoing operation. Note that when the abstract resource allocation unit 707 has already received multiple slice requests and will no longer receive a slice request, the abstract resource allocation unit 707 may skip the operation of step S1. When the remaining slice request quantity is 0 (step S5: Yes), the abstract resource allocation unit 707 notifies the physical path allocation unit 709 of information such as the abstract resource allocated to the slice and the applicable abstract path, and instructs the physical path allocation unit 709 to reserve a physical resource (step S6). The physical path allocation unit 709 and the physical device setting unit 710 perform setting of the available bandwidth and the like on each device in the physical network. This causes a change in the information about resource of each device in the physical network.

In the controller 70, the physical network information acquisition unit 701 obtains information about resource and information about connection between each device pair from each device in the physical network. The physical path calculation unit 702 calculates physical path resource information based on the information about resource of each device and on the information about connection between each device pair. The abstract path resource calculation unit 703 calculates abstract path resource information based on the physical path resource information. The abstract path correlation calculation unit 704 generates correlation information based on the bottleneck link information of each abstract path. The resource pool 705 updates the abstract path resource information and the correlation information that have been stored, with the abstract path resource information calculated by the abstract path resource calculation unit 703 and with the correlation information generated by the abstract path correlation calculation unit 704. When the abstract path resource information and the correlation information stored in the resource pool 705 are updated, the temporary resource pool 706 reads the abstract path resource information and the correlation information from the resource pool 705, and updates the abstract path resource information and the correlation information that have been stored.

When the temporary resource pool 706 has not been updated (step S7: No), the controller 70 performs the foregoing operation, while when the temporary resource pool 706 has been updated (step S7: Yes), the controller 70 terminates the process.

Note that the abstract path resource calculation unit 703 may compare the amounts of resource of each link of the physical path of the respective abstract paths that share at least part of a physical path to calculate the changeable amount of resource among the applicable abstract paths. In this case, the resource pool 705 stores the changeable amount of resource calculated by the abstract path resource calculation unit 703. The temporary resource pool 706 obtains the changeable amount of resource from the resource pool 705, and stores the changeable amount of resource.

A hardware configuration of the controller 70 will next be described. In the controller 70, the physical network information acquisition unit 701, the physical path calculation unit 702, the abstract path resource calculation unit 703, the abstract path correlation calculation unit 704, the resource pool 705, the temporary resource pool 706, the abstract resource allocation unit 707, the temporary resource calculation unit 708, the physical path allocation unit 709, and the physical device setting unit 710 are implemented in processing circuitry. The processing circuitry may be a combination of a processor that executes a program stored in a memory and the memory, or may be a dedicated hardware element. The processing circuitry is also referred to as control circuit.

Figure 10:
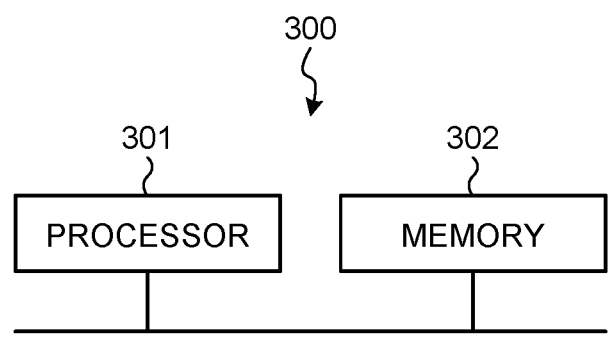
FIG. 10 is a diagram illustrating an example configuration of processing circuitry included in the controller according to the first embodiment when the processing circuitry is implemented by a processor and a memory.

FIG. 10 is a diagram illustrating an example configuration of processing circuitry 300 when the processing circuitry included in the controller 70 according to the first embodiment is implemented by a processor 301 and a memory 302. The processing circuitry 300 illustrated in FIG. 10 is a control circuit. The processing circuitry 300 includes the processor 301 and the memory 302. When the processing circuitry 300 includes the processor 301 and the memory 302, each functionality of the processing circuitry 300 is implemented in software, firmware, or a combination of software and firmware. The software or firmware is described in the form of a program, and is stored in the memory 302. In the processing circuitry 300, each functionality is implemented by the processor 301 by reading and executing a program stored in the memory 302. That is, the processing circuitry 300 includes the memory 302 for storing a program that causes an operation of the controller 70 to be performed. It can also be said that this program is a program for causing the controller 70 to perform each functionality to be provided by the processing circuitry 300. This program may be provided using a storage medium storing the program or using another means such as a communication medium.

The foregoing program can also be said to be a program that causes the controller 70 to perform a first step in which the physical network information acquisition unit 701 obtains information about resource of a device and information about connection between devices in the wireless access network 200; a second step in which the physical path calculation unit 702 calculates physical path resource information, which is information about resource of a physical path between the devices, based on the information about resource of the device and on the information about connection between the devices; a third step in which the abstract path resource calculation unit 703 calculates, based on the physical path resource information, abstract path resource information representing representative of the physical path resource information; a fourth step in which the abstract path correlation calculation unit 704 generates correlation information, which is information about correlation between abstract paths, based on the abstract path resource information and on link information associated with information about resource extracted as the abstract path resource information; a fifth step in which the resource pool 705 stores the abstract path resource information and the correlation information; a sixth step in which the temporary resource pool 706 temporarily stores the abstract path resource information and the correlation information, which are each information stored in the resource pool 705; a seventh step in which upon reception of a slice request, the abstract resource allocation unit 707 determines whether a slice meeting the requirement can be generated, based on information stored in the temporary resource pool 706, and when the abstract resource allocation unit 707 determines that a slice meeting the requirement can be generated, the abstract resource allocation unit 707 issues an instruction to reserve a physical path; and an eighth step in which the temporary resource calculation unit 708 updates information in the temporary resource pool 706 based on an abstract resource that has been allocated to the slice from an abstract path by the abstract resource allocation unit 707.

In this respect, the processor 301 is, for example, a CPU, a processing unit, a computing unit, a microprocessor, a microcomputer, a digital signal processor (DSP), or the like. In addition, the memory 302 is, for example, a non-volatile or volatile semiconductor memory such as a random access memory (RAM), a read-only memory (ROM), a flash memory, an erasable programmable ROM (EPROM), or an electrically erasable programmable ROM (EEPROM) (registered trademark); a magnetic disk, a flexible disk, an optical disk, a compact disc, a MiniDisc, a digital versatile disc (DVD), or the like.

Figure 11:
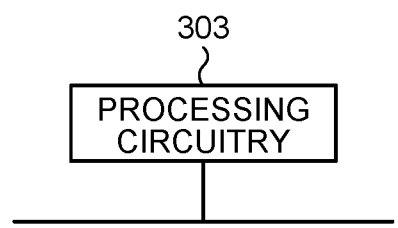
FIG. 11 is a diagram illustrating an example of the processing circuitry included in the controller according to the first embodiment when the processing circuitry is formed of a dedicated hardware element.

FIG. 11 is a diagram illustrating an example of the processing circuitry 303 when the processing circuitry included in the controller 70 according to the first embodiment is formed of a dedicated hardware element. The processing circuitry 303 illustrated in FIG. 11 is, for example, a single circuit, a set of multiple circuits, a programmed processor, a parallel programmed processor, an application specific integrated circuit (ASIC), a field programmable gate array (FPGA), or a combination thereof. The processing circuitry may be implemented partially in a dedicated hardware element and partially in software or firmware. Thus, the processing circuitry can implement each functionality described above in a dedicated hardware element, software, firmware, or a combination thereof.

As described above, according to the present embodiment, upon reception of a slice request from the orchestrator 80, the controller 70 determines whether a slice meeting the requirement can be generated, based on information stored in the temporary resource pool 706. When the controller 70 determines that a slice meeting the requirement can be generated, the controller 70 updates the temporary resource pool 706 based on the amount of allocation of the abstract resource, and then performs an operation for a next slice request.

The use of abstract resource enables the controller 70 to determine whether a slice meeting the requirement can be generated without referring to information about resource of each device and information about connection between each device pair. In addition, by storing also correlation information in the temporary resource pool 706, the controller 70 can improve accuracy of recognition of the amount of available resource in slice generation.

In addition, the controller 70 does not need to update a physical path, that is, the physical network information acquisition unit 701, the physical path calculation unit 702, the abstract path resource calculation unit 703, and the abstract path correlation calculation unit 704 need to perform no operation, each time the controller 70 processes a slice request. This enables the controller 70 to promptly allocate an abstract resource and to reduce the load at the same time.

As described above, the controller 70 can perform resource allocation that satisfies the service requirement by accurate recognition of the amount of resource of each device in the wireless access network 200 while reducing the load imposed in slice generation.

Note that the controller 70 is illustrated, in the flowchart illustrated in FIG. 9, as repeating the operation relating to a slice request until the remaining slice request quantity reaches 0, but the operation is not limited thereto. The controller 70 may repeat the operation until a preset remaining slice request quantity reaches N. That is, the controller 70 performs the operation of step S6 when the remaining slice request quantity reaches N. This allows the controller 70 to achieve an effect of reducing inconsistency between the temporary resource pool 706 and actual resource pool 705 at that time. In the controller 70, the abstract resource allocation unit 707 consecutively allocates an abstract resource when the remaining slice request quantity, which is the number of remaining slice requests, is greater than 0 or is greater than a set value, and instructs the physical path allocation unit 709 to allocate a physical path when the remaining slice request quantity is 0 or the set value.

Meanwhile, the components providing each corresponding functionality included in the controller 70 may be configured not to be incorporated in a single device. That is, it is sufficient that the physical network information acquisition unit 701, the physical path calculation unit 702, the abstract path resource calculation unit 703, the abstract path correlation calculation unit 704, the resource pool 705, the temporary resource pool 706, the abstract resource allocation unit 707, the temporary resource calculation unit 708, the physical path allocation unit 709, and the physical device setting unit 710 be included in the wireless access network 200 illustrated in FIG. 1.

Second Embodiment

A second embodiment will be described below in the context of additional information of the correlation information. In the second embodiment, the controller 70 is configured similarly to the controller 70 in the first embodiment illustrated in FIG. 2.

Figure 12:
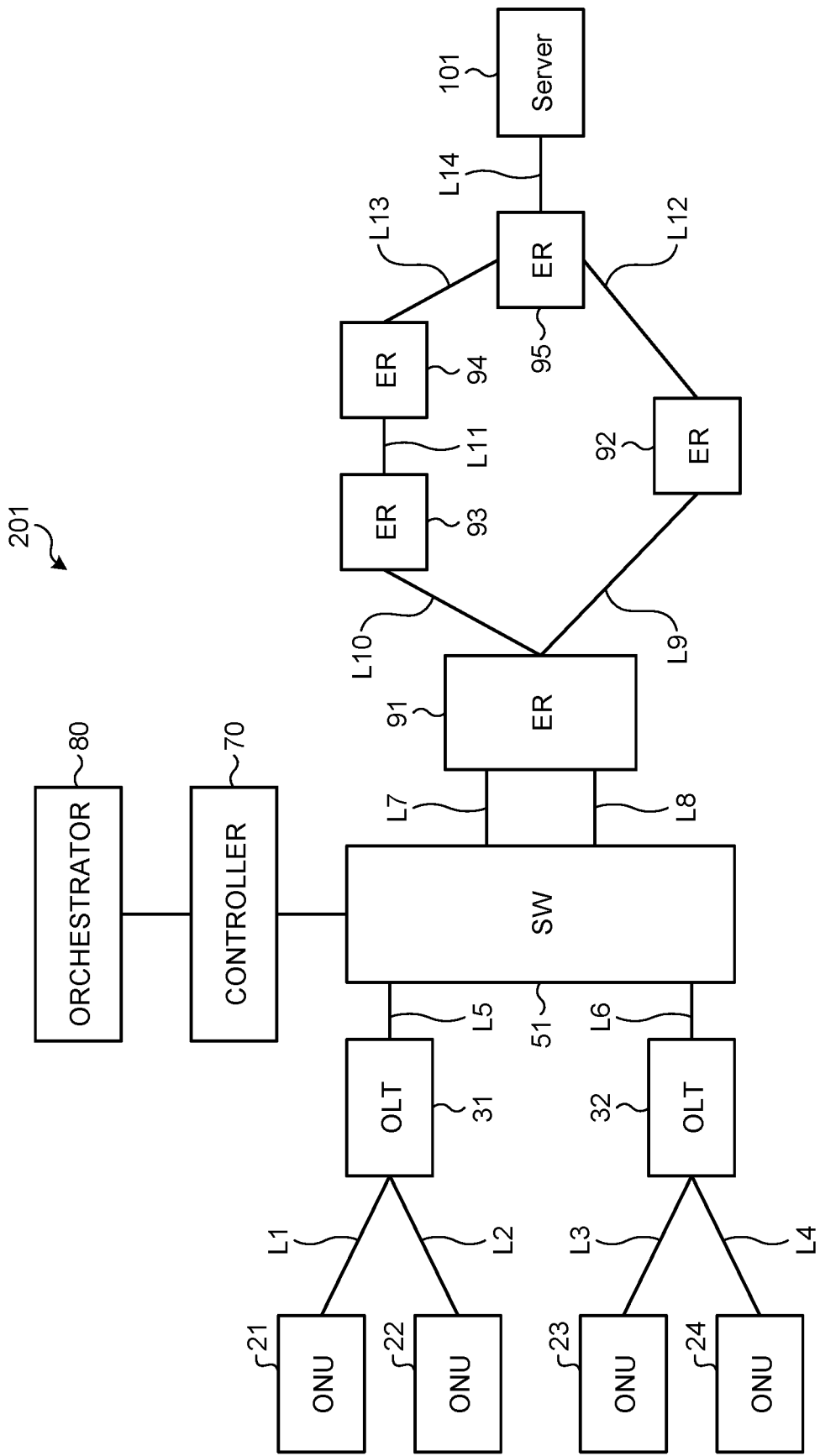
FIG. 12 is a first diagram illustrating an example configuration of a wireless access network according to a second embodiment.
Figure 13:
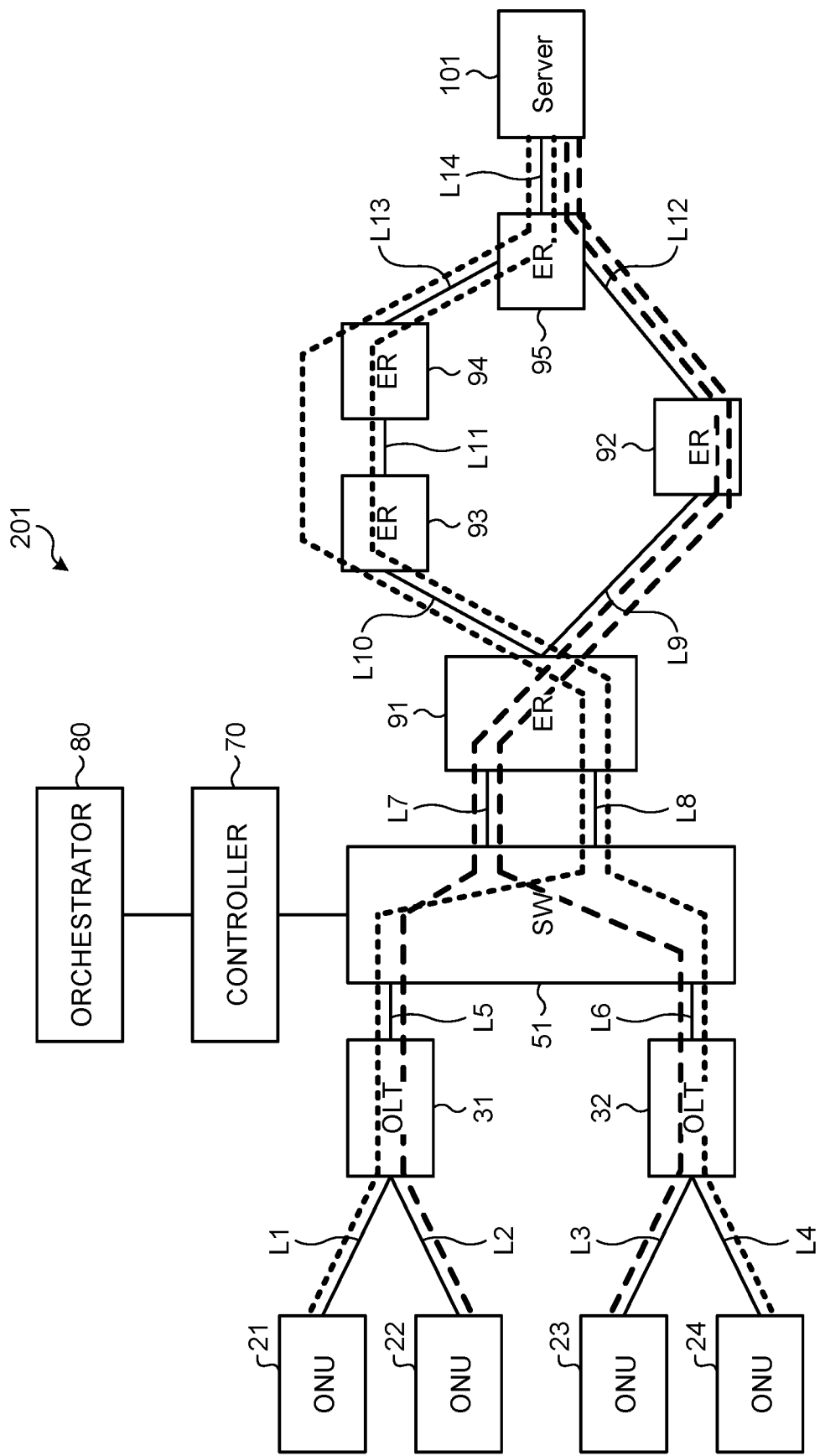
FIG. 13 is a second diagram illustrating an example configuration of the wireless access network according to the second embodiment.

FIG. 12 is a first diagram illustrating an example configuration of a wireless access network 201 according to the second embodiment. FIG. 13 is a second diagram illustrating an example configuration of the wireless access network 201 according to the second embodiment. The wireless access network 201 includes the ONUs 21 to 23, an ONU 24, the OLTs 31 and 32, the SW 51, edge routers (ERs) 91 to 95, a server 101, the controller 70, and the orchestrator 80. In the second embodiment, network devices include the ONUs 21 to 24, the OLTs 31 and 32, the SW 51, the ERs 91 to 95, and the server 101. Assume here that through resource abstraction, abstract path 1 is established between the ONU 21 and the server 101, abstract path 2 is established between the ONU 22 and the server 101, abstract path 3 is established between the ONU 23 and the server 101, and abstract path 4 is established between the ONU 24 and the server 101. The actual physical paths are the routes indicated by broken lines of FIG. 13. The ONU 21 and the ONU 24 share a link L8 on the route to the server 101. The link L8 is a bottleneck link in the resources of abstract path 1 and of abstract path 4.

In such case, the abstract path correlation calculation unit 704 of the controller 70 generates correlation information as illustrated in FIG. 7 or 8 as described in connection with the first embodiment. In the second embodiment, the abstract path correlation calculation unit 704 further generates additional information illustrated in FIG. 14 as additional information of the correlation information in FIG. 7 or 8. FIG. 14 is a diagram illustrating additional information of the correlation information, generated by the abstract path correlation calculation unit 704 according to the second embodiment. The additional information illustrated in FIG. 14 represents thresholds each for determining whether another abstract path will be affected by the amount of abstract resource to be allocated to the abstract path that is the path for allocation. That is, the abstract path correlation calculation unit 704 generates additional information representing the abstract path(s) that will be affected when the abstract resource increases or decreases in a certain abstract path. FIG. 14 illustrates that, for example, allocation of a bandwidth of 200 Mbps or 400 Mbps to a slice from the abstract resource of abstract path 1 will cause the bottleneck link for abstract path 4 or the bottleneck link for abstract path 2 to change, respectively. The phrase "bottleneck link changes" means that, for example, the bottleneck link changes from the link L7 to the link L5.

In the second embodiment, the controller 70 has a larger table size in the resource pool 705 than the table size in the first embodiment, but can determine whether to update the resource pool 705 based on the amount of allocation in abstract resource allocation. This enables the controller 70 to make a rapid determination of applicability of allocation using an abstract resource while reducing an increase in processing load caused by unnecessary updating of the resource pool 705. In the second embodiment, when the controller 70 allocates an abstract resource from an abstract path to a slice in an amount greater than the threshold represented in the additional information of FIG. 14, the controller 70 performs physical path allocation, and updates the resource pool 705.

A controller according to the present disclosure is advantageous in capability of performing resource allocation that satisfies the service requirement by accurate recognition of the amount of resource of each device in the wireless access network while reducing the load imposed in slice generation.

The configurations described in the foregoing embodiments are merely examples. These configurations may be combined with a known other technology, and configurations of different embodiments may be combined together. Moreover, part of the configurations may be omitted and/or modified without departing from the spirit thereof.

What is claimed is:

1. A controller comprising:
physical network information acquisition circuitry to obtain information about resource of a device and information about connection between devices in a wireless access network;
physical path calculation circuitry to calculate physical path resource information based on the information about resource of the device and on the information about connection between the devices, the physical path resource information being information about resource of a physical path between the devices;
abstract path resource calculation circuitry to calculate abstract path resource information based on the physical path resource information, the abstract path resource information representing representative of the physical path resource information;
abstract path correlation calculation circuitry to generate correlation information based on the abstract path resource information and on link information associated with information about resource extracted as the abstract path resource information, the correlation information being information about correlation between abstract paths;
a resource pool to store the abstract path resource information and the correlation information;
a temporary resource pool to temporarily store the abstract path resource information and the correlation information, each being information stored in the resource pool;
abstract resource allocation circuitry to determine, upon reception of a slice request, whether a slice meeting a requirement is capable of being generated, based on information stored in the temporary resource pool, and to issue an instruction to reserve a physical path when determining that a slice meeting the requirement is capable of being generated; and
temporary resource calculation circuitry to update the information in the temporary resource pool based on an abstract resource allocated to the slice from the abstract path by the abstract resource allocation circuitry.

2. The controller according to claim 1, wherein
the abstract path correlation calculation circuitry extracts abstract paths having a same bottleneck link as each other, using link information of a bottleneck to generate the correlation information, the bottleneck being used in calculating the abstract path resource information by the abstract path resource calculation circuitry.

3. The controller according to claim 1, wherein
the abstract path correlation calculation circuitry generates additional information representing an abstract path that is affected when the abstract resource increases or decreases in a certain one of the abstract paths.

4. The controller according to claim 1, wherein
the temporary resource pool obtains the abstract path resource information and the correlation information from the resource pool each time the abstract path resource calculation circuitry calculates the abstract path resource information, the abstract path correlation calculation circuitry generates the correlation information, and the resource pool stores the abstract path resource information and the correlation information.

5. The controller according to claim 1, wherein
the temporary resource calculation circuitry updates an abstract resource of the abstract path that has undergone allocation, based on a result of allocation of the abstract resource performed by the abstract resource allocation circuitry, and furthermore updates an abstract resource of the abstract resource that is affected, based on the correlation information.

6. The controller according to claim 1, wherein
the abstract path resource calculation circuitry compares amounts of resource of each link of the physical path of abstract paths that share at least part of the physical path to calculate changeable amount of resource among the abstract paths.

7. The controller according to claim 6, wherein
the resource pool stores the changeable amount of resource calculated by the abstract path resource calculation circuitry, and
the temporary resource pool stores the changeable amount of resource.

8. The controller according to claim 1, wherein
the abstract resource allocation circuitry consecutively allocates an abstract resource when a remaining slice request quantity is greater than 0 or is greater than a set value, the remaining slice request quantity being a number of remaining slice requests, and issues an instruction to allocate the physical path when the remaining slice request quantity is 0 or the set value.

9. A control circuit for controlling a controller of a wireless access network, the control circuit causing the controller to perform:
obtaining information about resource of a device and information about connection between devices in a wireless access network;
calculating physical path resource information based on the information about resource of the device and on the information about connection between the devices, the physical path resource information being information about resource of a physical path between the devices;
calculating abstract path resource information based on the physical path resource information, the abstract path resource information representing representative of the physical path resource information;
generating correlation information based on the abstract path resource information and on link information associated with information about resource extracted as the abstract path resource information, the correlation information being information about correlation between abstract paths;
storing, by a resource pool, the abstract path resource information and the correlation information;
temporarily storing, by a temporary resource pool, the abstract path resource information and the correlation information, each being information stored in the resource pool;
determining, upon reception of a slice request, whether a slice meeting a requirement is capable of being generated, based on information stored in the temporary resource pool, and issuing an instruction to reserve a physical path when determining that a slice meeting the requirement is capable of being generated; and
updating the information in the temporary resource pool based on an abstract resource allocated to the slice from the abstract path.

10. A resource allocation method for use in a controller of a wireless access network, the resource allocation method comprising:
obtaining information about resource of a device and information about connection between devices in a wireless access network;

calculating physical path resource information based on the information about resource of the device and on the information about connection between the devices, the physical path resource information being information about resource of a physical path between the devices;
calculating abstract path resource information based on the physical path resource information, the abstract path resource information representing representative of the physical path resource information;
generating correlation information based on the abstract path resource information and on link information associated with information about resource extracted as the abstract path resource information, the correlation information being information about correlation between abstract paths;
storing the abstract path resource information and the correlation information in a resource pool;
temporarily storing the abstract path resource information and the correlation information in a temporary resource pool, each of the abstract path resource information and the correlation information being information stored in the resource pool;
upon reception of a slice request, determining whether a slice meeting a requirement is capable of being generated, based on information stored in the temporary resource pool, and issuing an instruction to reserve a physical path when determining that a slice meeting the requirement is capable of being generated; and
updating the information in the temporary resource pool based on an abstract resource allocated to the slice from the abstract path.

* * * * *